Sept. 13, 1960 G. H. APPEL 2,952,172
APPARATUS FOR RELIEVING STRESSES IN AND
STRAIGHTENING TUBULAR WORKPIECES
Original Filed April 25, 1958 5 Sheets-Sheet 1
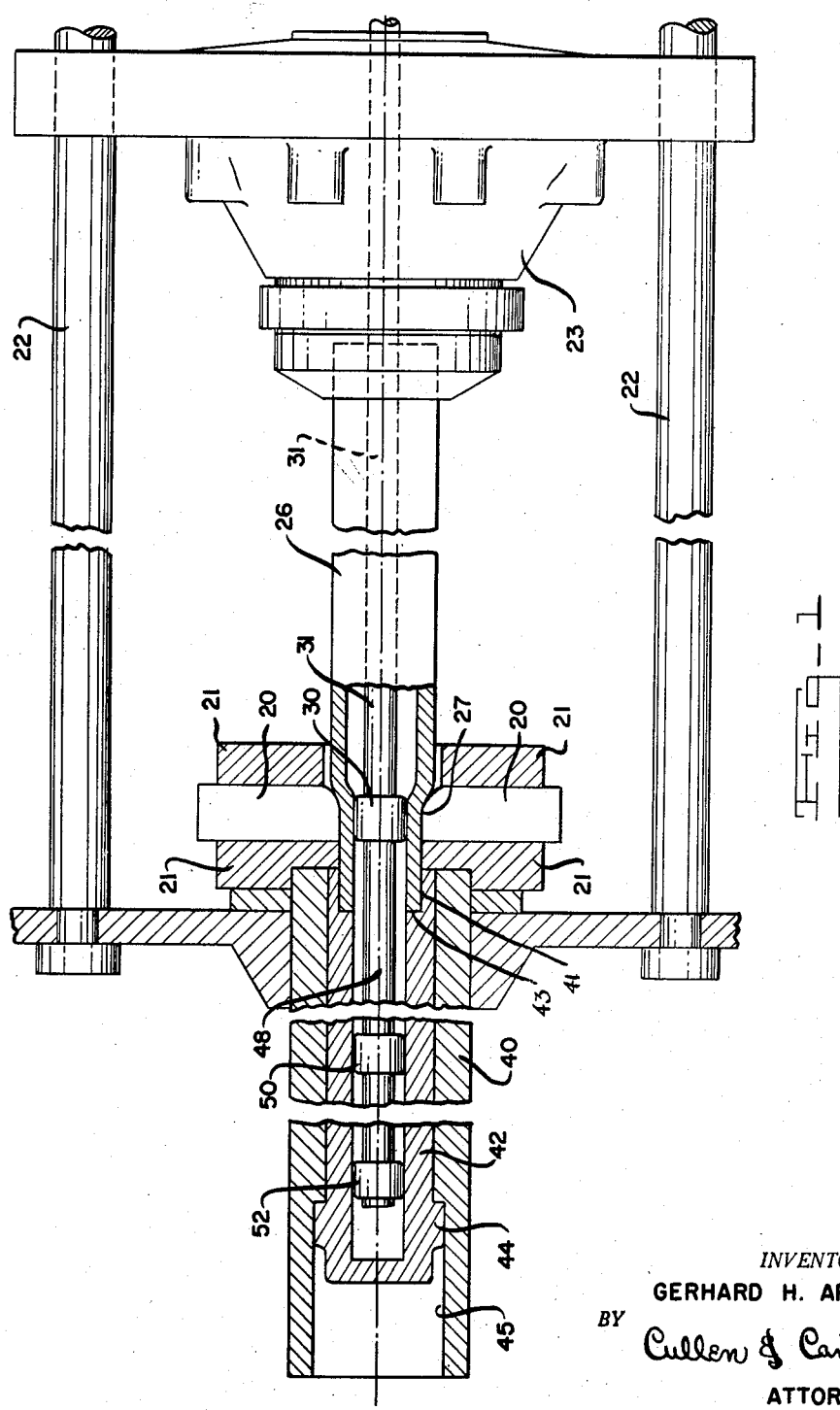
INVENTOR.
GERHARD H. APPEL
BY Cullen & Cantor
ATTORNEYS

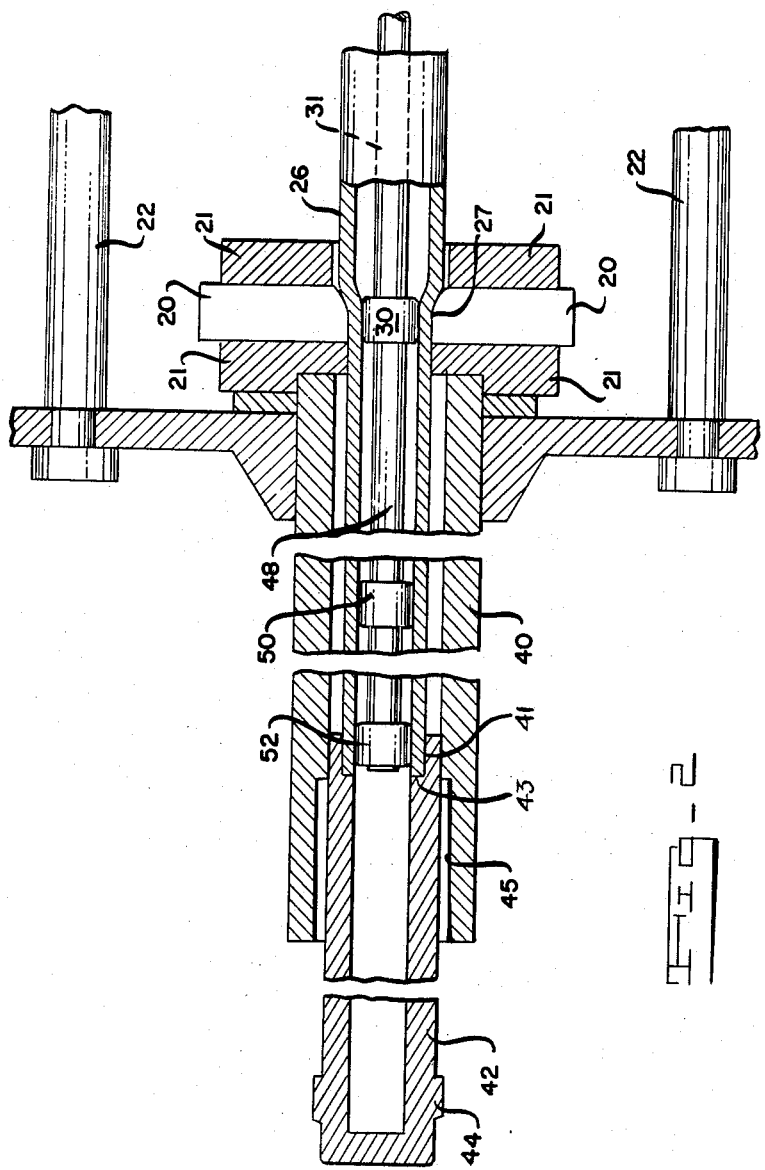

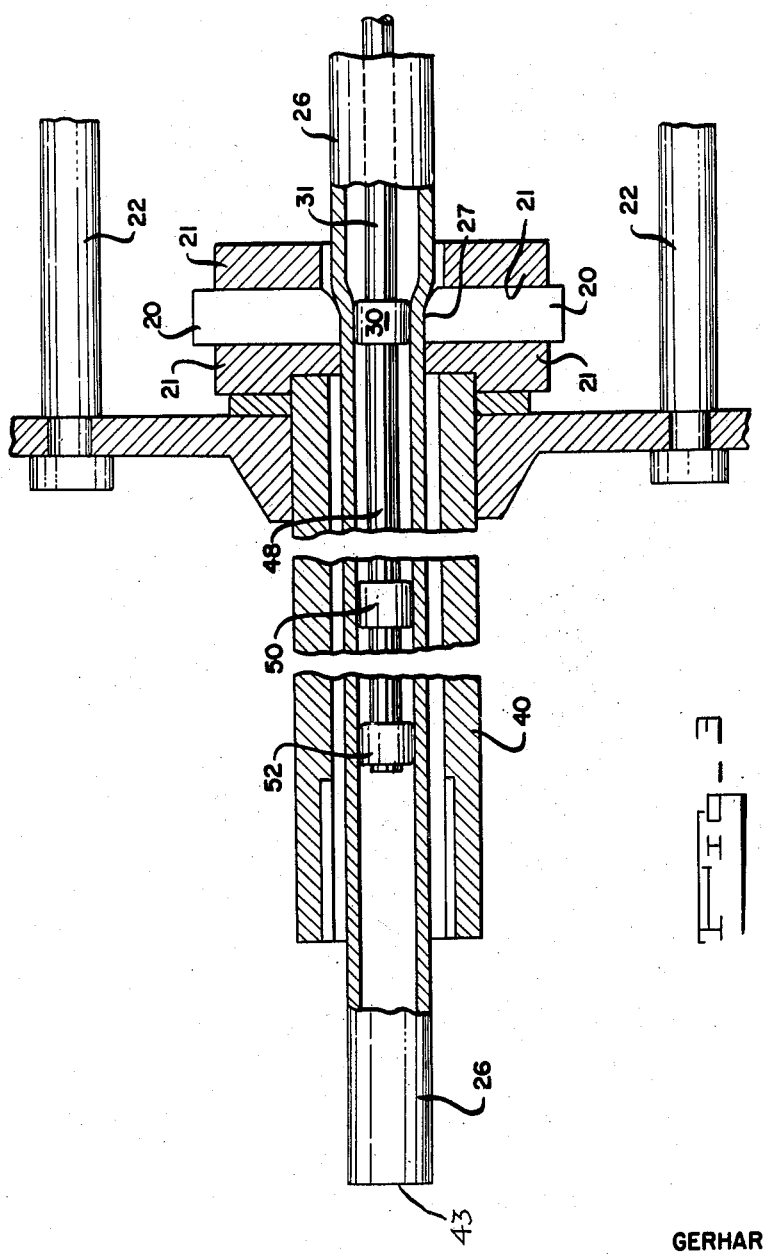

Sept. 13, 1960 G. H. APPEL 2,952,172
APPARATUS FOR RELIEVING STRESSES IN AND
STRAIGHTENING TUBULAR WORKPIECES
Original Filed April 25, 1958 5 Sheets-Sheet 4
I. FEED— DIES OPEN — NO STRESS
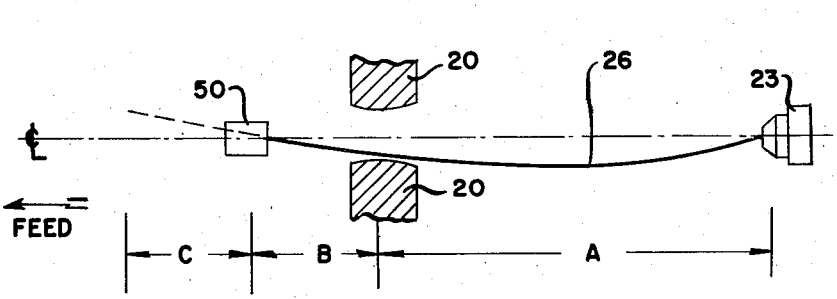
II. DIES CLOSED — NOT YET PLASTICIZED
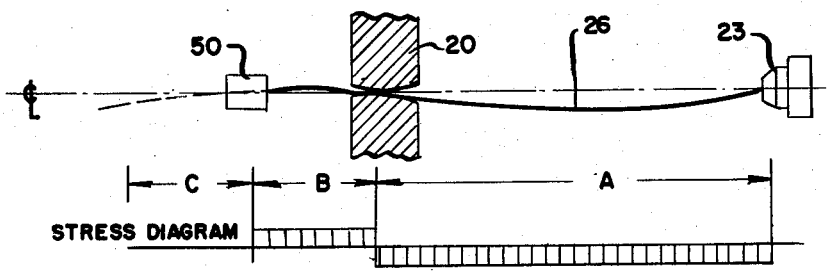
III. PLASTICIZING
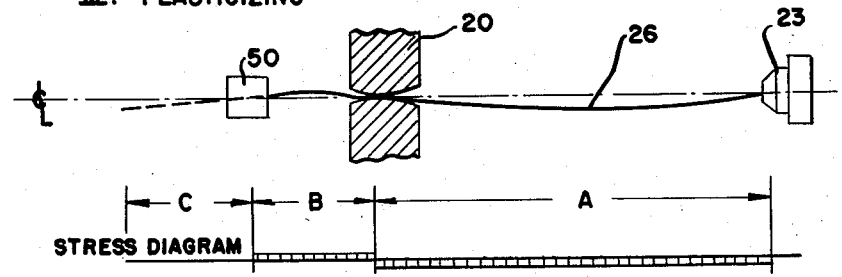
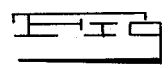
INVENTOR.
GERHARD H. APPEL
BY
ATTORNEYS Sept. 13, 1960  G. H. APPEL  2,952,172
APPARATUS FOR RELIEVING STRESSES IN AND
STRAIGHTENING TUBULAR WORKPIECES
Original Filed April 25, 1958  5 Sheets-Sheet 5
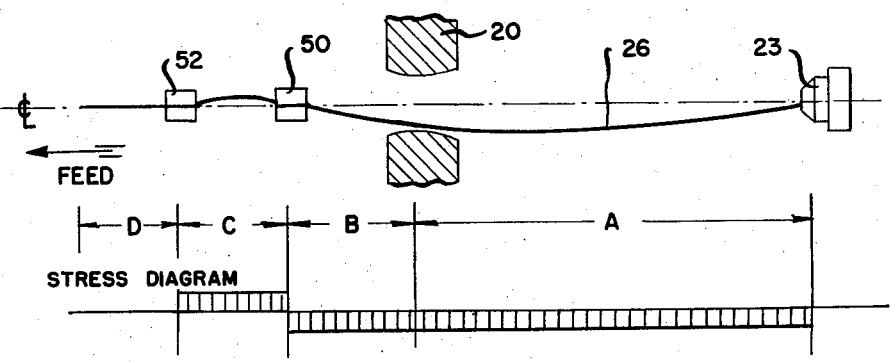
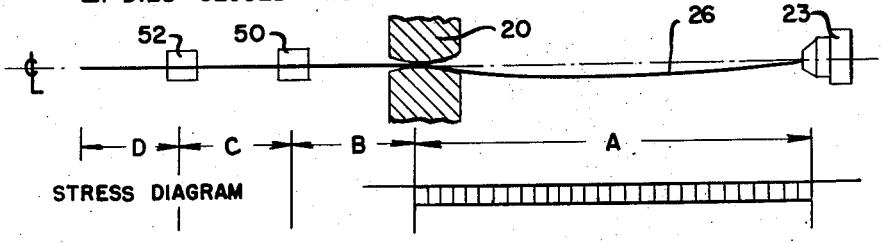
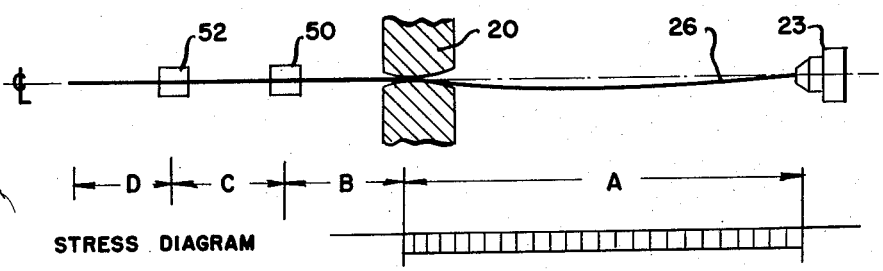
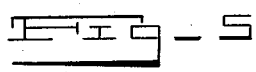
INVENTOR.
GERHARD H. APPEL
BY
ATTORNEYS

United States Patent Office 2,952,172
Patented Sept. 13, 1960

2,952,172

APPARATUS FOR RELIEVING STRESSES IN AND STRAIGHTENING TUBULAR WORKPIECES

Gerhard H. Appel, Belle River, Ontario, Canada, assignor to Appel Process, Ltd., Oshawa, Ontario, Canada Original application Apr. 25, 1958, Ser. No. 730,850. Divided and this application Mar. 9, 1959, Ser. No. 798,151

4 Claims. (Cl. 78—14)

This application relates to apparatus for forming and straightening and relieving stresses in tubular workpieces; and is a division of my prior copending application Ser. No. 730,850 of April 25, 1958 directed to methods.

In my United States Patent No. 2,894,421 of July 14, 1959, I disclose a machine for forming workpieces characterized by the fact that the workpiece feed is incremental and intermittent and in off-beat relation to the movement of dies radially and transversely of the workpiece feed axis for forming the workpiece. The dies and the feed means move in off-beat relation so that the dies form the increments positioned within their throat while no feed takes place, and feeding takes place between forming movements of the dies, and die movements towards the workpiece axis take place between incremental feeding strokes.

That patent also discloses the use of a mandrel within the workpiece and coaxial with the throat when the workpiece is a tube to be formed on a mandrel.

In that patent I also disclose a push feed means for push feeding a workpiece to and through the throat of the dies, such feeding means including a chuck which holds the workpiece and is positioned a substantial distance behind the throat of the dies with the chuck moving on rails of the machine in properly guided relation, so that the axis of feed is the same as the mandrel axis and the throat axis.

In that patent I also disclose an apparatus which is arranged to cooperate with a workpiece and receive and hold and guide its leading end as it passes from the throat of the dies at one point ahead of the throat of the dies in a manner to hold the workpiece increment that has already been formed in the throat and at that time relieved of stresses, holding such increment while another increment of the workpiece behind the first named increment is being formed in the throat of the dies and there relieved of stresses.

In this application, I disclose a means, particularly adapted for tubular workpieces, which supports the leading portion of a tubular workpiece as it emerges from the throat of the dies at two longitudinally spaced points ahead of the throat of the dies. These supporting means, positioned ahead of the throat of the die at two points which are longitudinally spaced from each other and from the throat of the die, support and receive and hold increments of the workpiece emerging from the throat of the dies where they have been relieved of stresses as they are formed in the dies while following increments of the workpiece are being formed in the dies and there relieved of stresses.

Inasmuch as the machine in general and the feeding means in general are both disclosed with great clarity in the aforementioned patent and by this time are well-known to those skilled in the art and inasmuch as the details of construction of such feeding means and of such machine in general form no part per se of the present invention, the same will not be disclosed except to the extent necessary for a proper understanding of the invention as embodied in the device disclosed in the appended drawings described in the following specification.

In these drawings:

Fig. 1 is a longitudinal section view of a machine formed in accordance with the invention with two points of support ahead of the throat of the dies and longitudinally spaced from each other and from the dies throat, with the parts shown in a beginning stage of the forming operation.

Figs. 2 and 3 are similar views but showing the parts in later stages of the forming operation.

Figs. 4–5 are diagrammatic views.

Referring to the drawings, the apparatus shown is adapted to carry out the new straightening and stress relieving method in cooperation with a forming machine of the type disclosed in said patent. The machine comprises a die set 20 supported on a frame 21 which is part of the fixed structure of the machine. Such frame has fixed parallel rails 22 which support and guide a feeding chuck 23 for linear movement towards and from the dies. Any suitable drive means may be utilized for so moving the chuck. The chuck grips and supports one end of a workpiece such as the metal tube 26 and the chuck advances towards the dies to feed the workpiece axially through the throat 27 of these dies.

The dies move radially and transversely of the axis of feed of the workpiece 26 and their working faces which define throat 27 are shaped to form the work to any desired external contour, the forming operation being effected upon a mandrel 30 disposed within the tubular workpiece within the die throat. The mandrel may be supported in any well-known manner as for example by having a part 31 rearwardly extending through the chuck 23 and being supported on fixed structure of the machine at its rear end.

In operation, the chuck and the workpiece are advanced intermittently and in off-beat relation to the stroke of the dies to feed the workpiece axially through the die set. Between feeding strokes the dies are actuated to subject the increment of the workpiece within the die throat to the forces or loads on the dies, with all of the dies acting simultaneously on the entire area of the workpiece within the throat of the dies, the dies girdling the workpiece substantially completely for this purpose.

The die elements plasticize the material and force it into precise axial alignment with the throat. The longitudinal stresses within the increment of the workpiece in the throat are completely relieved when the material becomes plastic under the dies and as the increment formed within the dies leaves the throat of the dies that increment is relieved of stresses. It will be clear by now that if that increment can thereafter be maintained in strict axial alignment with the throat of the dies and the path of the chuck supporting the workpiece and feeding it, that increment will remain relieved of stresses, will remain straight and in proper alignment with the axes and throats of the chuck and dies as desired.

Accordingly, support means which specifically form the present invention have been provided and such will now be described.

The support means includes the following major elements. First, there is a fixed outer tube 40 supported from fixed structure 21 of the machine.

Secondly, within this outer tube 40 is a slidable inner tube 42 formed so that a counterbore 41 at its trailing end receives the leading end 43 of the workpiece and further formed with a shoulder 44 near its leading end which cooperates with the interior surface 45 of the fixed tube 40 whereby the latter functions as a guide during the longitudinal movement of the inner tube 42 in response to forward movement of the leading end of the workpiece 26 as the latter is fed through the die throat.

The third element is an extension 48 of the mandrel 30 which projects forwardly from the die throat 27 a considerable distance and is provided with two longitudinally spaced shoulders or discs 50—52 well forward of the die throat. The extension 48 and consequently the shoulders 50, 52 are unitary with the mandrel 30 and its rearward extension 31 and hence the shoulders 50, 52 provide supports as well as guides for the inner tube 42 and likewise for the leading end of the workpiece 26 as the latter is fed well past the die throat 27 during the later stages of the forming operation of the long workpiece.

The function and operation of the parts just described is as follows:

Normally, the inner tube 42 is positioned as close as possible to the die throat 27 so as to receive and be engaged at 41 by the leading end 43 of the workpiece 26 as it emerges from the die throat. Thereupon, the leading end 43 of the workpiece moves forwardly and in so moving moves the inner tube forwardly, with the latter being guided in its movement by the shoulders 50, 52 of the mandrel extension 48 as well as by its own shoulder 44 guided by the inner surface 45 of the outer tube 40. Thereafter, the leading end of the workpiece reaches the first shoulder 50 of the mandrel extension 48 so as to be guided thereby and subsequently the leading end of the workpiece, after passing by the first shoulder reaches the second shoulder 52 of the mandrel extension so as to be guided by it. At this moment, the inner tube 42 has completed its function of supporting the leading end 43 of the workpiece. The inner tube soon reaches and passes beyond the forward open end of the fixed tube 40 of the machine thereupon the inner tube 42 may be removed from the leading end of the workpiece and thus from the machine and put to one side. Thereafter, the leading end of the workpiece advances beyond the leading end of the fixed tube 40 and onto conventional supports (not shown) outside the machine.

During all this time, and during the entire process following increments of the workpiece were being formed in the die throat and were at that time being relieved of stresses. Meanwhile, leading increments of the workpiece, after leaving the die throat wherein they were destressed were supported and guided in strict axial alignment with the die throat and the throat of the chuck, by part 41 of the inner tube 40 at first, and later by the shoulders 50, 52 directly, these first having cooperated with the leading end of the workpiece through the inner tube but later cooperating directly with the leading end of the workpiece.

As disclosed in my Patent No. 2,894,421, counterpressure means may be provided for yieldably resisting and controlling the advance of the inner tube 40 during the early part of the forming operation and such resistance means may take any desired form. For example, it may be provided by suitable pneumatic or hydraulic resistance means all well-known to the art and forming no part per se of the present invention.

Upon completion of the forming operation the dies are opened up to enable withdrawal of the work, the feeding means 23 are retracted in the usual manner and the machine is now ready for receiving once again the inner tube 40 which had previously been set aside and also for receiving another workpiece which is to be formed over its length upon the mandrel by means of the dies and which may be formed for any desired length within the feeding capacity of the machine.

The novel method hereof improves the product, delivering a finished tubular workpiece which is precisely straight and is completely free of longitudinal stresses and which are of a substantial degree of accuracy with respect to uniformity of thickness of the workpiece wall.

It is obvious that with the axis defined by the two shoulders, the die throat and the feeding chuck being a straight line, defined by the four points just mentioned, workpieces of great length may be delivered by the machine with the workpieces, despite their great length, being truly straight, quite nearly perfect as to uniformity of wall thickness, and with the increments of the workpiece once relieved of stresses in the forming die remaining relieved of longitudinal stresses.

In this application we have also disclosed diagrammatically the operation of the double support hereof as contrasted from the single support of my prior Patent No. 2,894,421.

Fig. 4 shows the single support operation diagrammatically through several parts of the movements of the dies and the workpiece, and Fig. 5 contrasts the foregoing with a similar view but disclosing the operation of the double support of this application.

In these drawings a tubular workpiece 26 is held at the right end in a feed chuck 23 and is supported at the left end by a single support 50 in Fig. 4 and double support 50, 52 in Fig. 5. Between the chuck and the support or supports as the case may be are the dies 20.

*Fig. 4—Single support*

(I) Now referring to Fig. 4, the single support diagram, we see that when the dies 20 are open the workpiece 26 which is really truly straight is shown bowed or curved between the chuck 23 and the support 50 in parts A—B of the workpiece.

(II) As the dies close, they transform the single bow in the workpiece, A and B, into two bows, B, between support 50 and dies 20, and A, between dies 20 and chuck 23. The stress diagram shows that now parts A and B are both under stress.

(III) As the closed dies plasticize and the work increment within the dies throat is completed, the double bow A—B still remains and these parts A and B, though relieved of longitudinal stresses to a considerable extent, remain still under lateral stress, as shown in the stress diagram, though in a reduced amount, due to mass inertia.

As feed continues, the completed part C of the workpiece, beyond support 50 will deflect from the centerline and take a position at an angle to the centerline.

Hence, though a single support functions to a considerable extent to straighten the workpiece and to relieve stresses therein as described in the prior application, nevertheless it does not completely prevent part C of the workpiece from leaving the centerline and feed axis and such part C of the workpiece takes an angle from the centerline as it emerges from the machine and some degree of inaccuracy of alignment and straightness of the workpiece results.

*Fig. 5—Double support*

On the other hand, when a double support is used as shown in Fig. 5, the parts C and D, that is to say, the part C between the two supports 50—52 and the part D beyond the support 52 not only are straight but also at all times remain in alignment with the feed axis and centerline of the chuck, the dies throat and the support.

(I) When the process starts, with the dies open, part A—B will be bowed and part C will likewise be bowed, but with its left end in the support 52, and the stresses in parts A—B—C will be as shown in the stress diagram.

(II) When the dies are closed, parts B and C will be displaced from the preceding position and will become straight and aligned with the feed axis and freed of stress, as shown in the stress diagram.

(III) When the dies are closed and plasticizing takes place, parts B—C and D remain straight and aligned with the feed axis and destressed, as shown in the stress diagram. When the dies open and the work increment completed, parts B, C and D will remain straight and aligned with the feed axis, and destressed.

Conclusion

Hence, it is clear that a double support gives quite a different result from a single support, namely the double support causes those parts of the workpiece beyond the first support to remain straight and aligned with the feed axis and destressed whereas in the case of a single support machine and method, the workpiece beyond the first support, regardless of what other characteristics it may possess, is not aligned with the feed axis but is deviated from it to some extent with resultant inaccuracies and distortions. These are prevented by the use of the double support machine of this application.

Now having described the machine hereof, reference should be had to the claims which follow.

I claim:

1. In an apparatus comprising a set of dies arranged radially and oppositely to provide a workpiece girdling and receiving throat, a mandrel within the die throat upon which a tubular workpiece is formed, means for intermittently moving the dies simultaneously and oppositely and radially inwardly towards the axis of such throat and plasticizing the increment of a tubular workpiece in such throat and on such mandrel, means for holding a workpiece in and for intermittently push feeding a workpiece axially through such throat, with the die moving means and the holding-feeding means operating in off-beat relation relatively, and means for receiving the emerging increment of a workpiece immediately as it leaves the throat and holding and guiding it through its travel in response to the feed in a path coaxial with the path of the workpiece through the die throat while next adjacent increments are being plasticized; the improvement which comprises, such means including an extension of such mandrel projecting forwardly from the die throat a substantial distance, shoulders on such extensions which are longitudinally spaced from each other and forwardly from the throat of the dies, and a tube telescoped around the mandrel extension and shoulders with the trailing end of such tube being formed for receiving the leading end of a workpiece as it emerges from the throat and to be engaged by such leading end and moved longitudinally and forwardly on the mandrel extension shoulders, the inner surfaces of the tube and workpiece being dimensioned to equal that of the shoulders so that the tube and workpiece closely fit on such shoulders to be guided thereby in their movement.

2. A construction according to claim 1 including an outer tube fixed to the machine and projecting forwardly from the die throat and receiving the inner tube, with the outer surface of the latter and the inner surface of the outer tube closely fitting and cooperating for guiding the inner tube in its movement from the die throat along the shoulders of the mandrel extension.

3. A construction according to claim 1 wherein the workpiece holding and feeding means is arranged to travel in a path coaxial with the path through the throat and the path travelled by the inner tube which guides the emerging increment of the workpiece.

4. In an apparatus comprising a set of dies arranged radially and oppositely to provide a workpiece girdling and receiving throat, a mandrel within the die throat upon which a tubular workpiece is formed, means for intermittently moving the dies simultaneously and oppositely and radially inwardly towards the axis of such throat and plasticizing the increment of a tubular workpiece in such throat and on such mandrel, means for holding a workpiece in and for intermittently push feeding a workpiece axially through such throat, with the die moving means and the holding-feeding means operating in off-beat relation relatively, and means for receiving the emerging increment of a workpiece immediately as it leaves the throat and holding and guiding it through its travel in response to the feed in a path coaxial with the path of the workpiece through the die throat while next adjacent increments are being plasticized; the improvement which comprises, such means including an extension of such mandrel projecting forwardly from the die throat a substantial distance, shoulders on such extension which are longitudinally spaced from each other and forwardly from the throat of the dies, the shoulders being equal in dimension to the workpiece inner diameter so that the workpiece closely fits such shoulders as it moves by them.

References Cited in the file of this patent

UNITED STATES PATENTS

| | | |
|---|---|---|
| 431,041 | Fitzpatrick | July 1, 1890 |
| 1,816,488 | Lewis | July 28, 1931 |
| 2,114,302 | Harter | Apr. 19, 1938 |
| 2,668,461 | Henderson | Feb. 9, 1954 |
| 2,712,249 | Siegerist | July 5, 1955 |